US008095499B2

(12) United States Patent
Thanu (10) Patent No.: US 8,095,499 B2
(45) Date of Patent: Jan. 10, 2012

(54) QUERY CONSOLIDATION FOR STRUCTURED REPORTS

(75) Inventor: Lakshmi Narayanan Thanu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 10/969,371

(22) Filed: Oct. 19, 2004

(65) Prior Publication Data

US 2006/0085445 A1    Apr. 20, 2006

(51) Int. Cl.
*G06F 17/30*    (2006.01)
(52) U.S. Cl. ........................................................ 707/607
(58) Field of Classification Search .................. 707/3–5, 707/102, 104.1
See application file for complete search history.

(56) References Cited

U.S. PATENT DOCUMENTS

| | | | |
|---|---|---|---|
| 6,317,750 B1 * | 11/2001 | Tortolani et al. ...................... 1/1 |
| 6,480,842 B1 * | 11/2002 | Agassi et al. ...................... 707/4 |
| 6,651,055 B1 * | 11/2003 | Kilmer et al. ...................... 707/3 |
| 6,694,322 B2 * | 2/2004 | Warren et al. .................. 707/101 |
| 6,871,345 B1 * | 3/2005 | Crow et al. .................... 717/175 |
| 6,947,929 B2 * | 9/2005 | Bruce et al. ........................... 1/1 |
| 7,089,266 B2 * | 8/2006 | Stolte et al. ................ 707/104.1 |
| 7,110,997 B1 * | 9/2006 | Turkel et al. ...................... 707/3 |
| 2004/0088650 A1 * | 5/2004 | Killen et al. ..................... 715/503 |
| 2004/0215626 A1 * | 10/2004 | Colossi et al. ................ 707/100 |
| 2005/0010565 A1 * | 1/2005 | Cushing et al. ................... 707/3 |
| 2005/0010566 A1 * | 1/2005 | Cushing et al. ................... 707/3 |
| 2005/0108204 A1 * | 5/2005 | Gordon ............................. 707/3 |
| 2005/0235339 A1 * | 10/2005 | Lwo ................................. 726/2 |
| 2005/0283459 A1 * | 12/2005 | MacLennan et al. ............. 707/1 |
| 2006/0085444 A1 * | 4/2006 | Sarawgi et al. ............... 707/100 |
| 2006/0085445 A1 * | 4/2006 | Thanu ........................... 707/100 |

OTHER PUBLICATIONS

"Getting started with reporting services", 2004, 1-28, http://media.wiley.com/product_data/excerpt/87/07645687/0764568787.pdf.*

* cited by examiner

*Primary Examiner* — Neveen Abel Jalil
*Assistant Examiner* — Kellye Buckingham
(74) *Attorney, Agent, or Firm* — Merchant & Gould (57) ABSTRACT

Queries to obtain data from an OLAP cube for a structured report are consolidated. Queries to retrieve data from an OLAP cube for a structured report are consolidated into a single query. Using the consolidated query reduces the number of database hits; avoids reconstruction of the report from the results of the individual queries; and eases the exporting of the report to other applications. Instead of querying the OLAP cube multiple times, a single query is used to obtain the desired information from the cube. Each access definition within the structured report is examined to determine all of the data to be retrieved from the OLAP cube.

18 Claims, 5 Drawing Sheets

| | | 1997 | Q1 | Q2 | Q3 | Q4 |
|---|---|---|---|---|---|---|
| Yearly Income | $150K + | | | | | |
| Store | USA | | | | | |
| All Products | All Education Level | 5629 | 1433 | 1319 | 1462 | 1415 |
| Drink | All Education Level | 580 | 138 | 149 | 119 | 174 |
| Food | All Education Level | 4038 | 1065 | 883 | 1085 | 1005 |
| | Bachelors Degree | 940 | 242 | 228 | 269 | 201 |
| | Graduate Degree | 435 | 88 | 82 | 92 | 173 |
| | High School Degree | 1460 | 367 | 278 | 520 | 295 |
| | Partial College | 219 | 72 | 62 | 39 | 46 |
| | Partial High School | 984 | 296 | 233 | 165 | 290 |
| Non-Consumable | All Education Level | 1011 | 230 | 287 | 258 | 236 |

QUERY CONSOLIDATION FOR STRUCTURED REPORTS

BACKGROUND OF THE INVENTION

Online analytical processing (OLAP) is an integral part of most data warehouse and business analysis systems. OLAP services provide for fast analysis of multidimensional information. For this purpose, OLAP services provide for multi-dimensional access and navigation of the data in an intuitive and natural way, providing a global view of data that can be "drilled down" into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In OLAP, information is viewed conceptually as cubes, consisting of dimensions, levels, and measures. In this context, a dimension is a structural attribute of a cube that is a list of members of a similar type in the user's perception of the data. Typically, there are hierarchy levels associated with each dimension. For example, a time dimension may have hierarchical levels consisting of days, weeks, months, and years, while a geography dimension may have levels of cities, states/provinces, and countries. Dimension members act as indices for identifying a particular cell or range of cells within a multidimensional array. Each cell contains a value, also referred to as a measure, or measurement. Queries are created to access the data within the cube. It is important that this access be performed in an efficient manner.

SUMMARY OF THE INVENTION

Embodiments of the present invention are related to a method and system for consolidating queries to obtain data from an OLAP cube for a structured report. Queries to retrieve data from an OLAP cube for a structured report are consolidated into a single query. The consolidated query is directed at reducing the number of database hits; avoiding the reconstruction of the report from the results of the individual queries; and easing the exporting of the report to other applications. Instead of querying the OLAP cube multiple times to retrieve the data associated with the structured report, a single query is used to obtain the data from the cube.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings associated herein, unless the context clearly dictates otherwise. The term "cube" refers to a set of data that is organized and summarized into a multidimensional structure defined by a set of dimensions and measures.

The term "dimension" refers to a structural attribute of a cube, which is an organized hierarchy of categories (levels) that describe data in a fact table. These categories typically describe a similar set of members upon which the user wants to base an analysis. For example, a geography dimension might include levels for Country, Region, State or Province, and City.

The term "hierarchy" refers to a logical tree structure that organizes the members of a dimension such that each member has one parent member and zero or more child members.

The term "level" refers to the name of a set of members in a dimension hierarchy such that all members of the set are at the same distance from the root of the hierarchy. For example, a time hierarchy may contain the levels Year, Month, and Day.

The term "measure" refers to values within a cube that are based on a column in the cube's fact table store and are usually numeric. Measures are the central values that are aggregated and analyzed.

The term "member" refers to an item in a dimension representing one or more occurrences of data. A member can be either unique or non-unique. For example, 1997 and 1998 represent unique members in the year level of a time dimension, whereas January represents non-unique members in the month level because there can be more than one January in the time dimension if the cube contains data for more than one year.

The term "OLAP" refers to Online Analytical Processing. OLAP is a technology that uses multidimensional structures to provide rapid access to data for analysis. The source data for OLAP is commonly stored in data warehouses in a relational database.

The term "tuple(s)" refers to an ordered collection of members from different dimensions. For example, (Boston, [1995]) is a tuple formed by members of two dimensions: Geography and Time.

Consolidated Query System Level Overview

Generally, embodiments of the present invention are related to a method and system for consolidating queries to obtain data from an OLAP cube for a structured report. Queries to retrieve data from an OLAP cube for a structured report are consolidated into a single query. The single query is directed at reducing the number of database hits; avoiding reconstruction of the report from the results of the individual queries; and easing the exporting of the report to other applications. Instead of querying the OLAP cube multiple times, a single query is used to obtain the desired information from the cube. Each access definition within the structured report is examined to determine all of the data to be retrieved from the OLAP cube.

Figure 2:
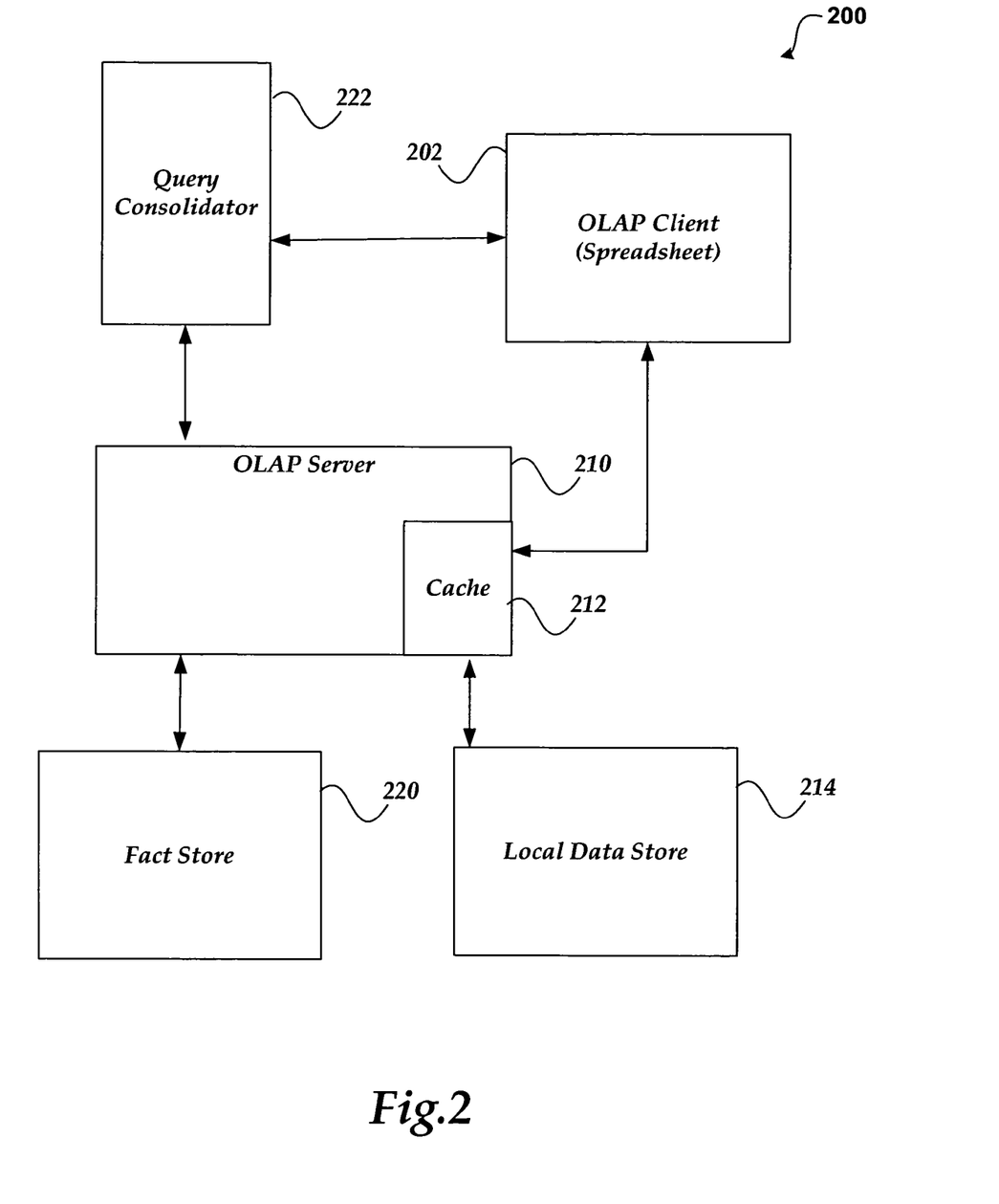
FIG. 2 illustrates a query consolidation system.

FIG. 2 illustrates a query consolidation system, in accordance with aspects of the present invention. As illustrated, the system includes OLAP client 202, query consolidator 222, OLAP server 210, local data store 214, and fact data store 220, all of which may interact with the data within an OLAP cube(s).

OLAP client 202 is an application program that uses the services of an OLAP system. OLAP client 202 may be any type of application that interacts with the OLAP system and queries an OLAP cube for data. According to one embodiment of the invention, OLAP client 202 is a spreadsheet program, such as the Excel® spreadsheet program by Microsoft Corporation. OLAP client 202 typically interacts with OLAP server 210 by issuing OLAP queries requesting data from a cube. These queries are parsed into a request for data from the cube, and the request is passed to the OLAP server 210.

Query consolidator 222 interacts with OLAP client 202 and OLAP server 210. According to one embodiment, query consolidator 222 is a plug-in to client application 202. According to another embodiment, the functionality of query consolidator 222 may be included within client 202 or some other program. Query Consolidator 222 accesses a spreadsheet (202) and generates a consolidated query to access the cube data referenced within a structured report within the spreadsheet. Generally, consolidator 222 examines the structured report within spreadsheet 202 and determines each axis within the structured report that accesses OLAP data. For each axis that accesses OLAP data, a query is generated that may be used to retrieve data within an OLAP cube. Once each of the individual queries is created, query consolidator 222 consolidates the queries to form a single consolidated query that is used to retrieve data from the cube. The consolidated query reduces the number of hits to the OLAP cube. Instead of hitting the OLAP cube for each axis within the structured report or every interaction, the cube is hit once, thereby reducing the time required to obtain the data from the cube. Consolidator 222 submits the consolidated query to OLAP server 210.

OLAP server 210 receives the query and controls the processing of the query. In one embodiment of the invention, OLAP server 210 maintains a local data store 214 that contains the data used to answer queries. In one embodiment of the invention, the OLAP server 210 is a version of the SQL Server OLAP product from Microsoft Corporation.

Local data store 214 contains records describing the cells that are present in a multidimensional database, with one record used for each cell that has measurement data present (i.e. no records exist for those cells having no measurement data). In an embodiment of the invention, local data store 214 is a relational database, such as SQL Server. In alternative embodiments of the invention, database systems such as Oracle, Informix or Sybase can be used. The invention is not limited to any particular type of relational database system.

OLAP server 210 populates local data store 214 by reading data from fact data store 220. Fact data store 220 is also a relational database system. In one embodiment of the invention, the system used is the SQL Server Database from Microsoft Corporation. In alternative embodiments of the invention, any type of relational database system may be used. For example, database systems such as Oracle, Informix or Sybase can be used.

According to one embodiment, records are stored in a relational table. This table can be indexed based on the dimensional paths of the record to allow rapid access to cell measurement data contained in the record.

In one embodiment of the invention, OLAP server 210 maintains a cache 212 of records. In this embodiment, cache 212 maintains data records that have been recently requested, or those data records that are frequently requested. Maintaining cell record data in a cache may help provide quicker responses to queries that can be satisfied by records appearing in the cache.

Exemplary Cube and Dimension

Figure 3:
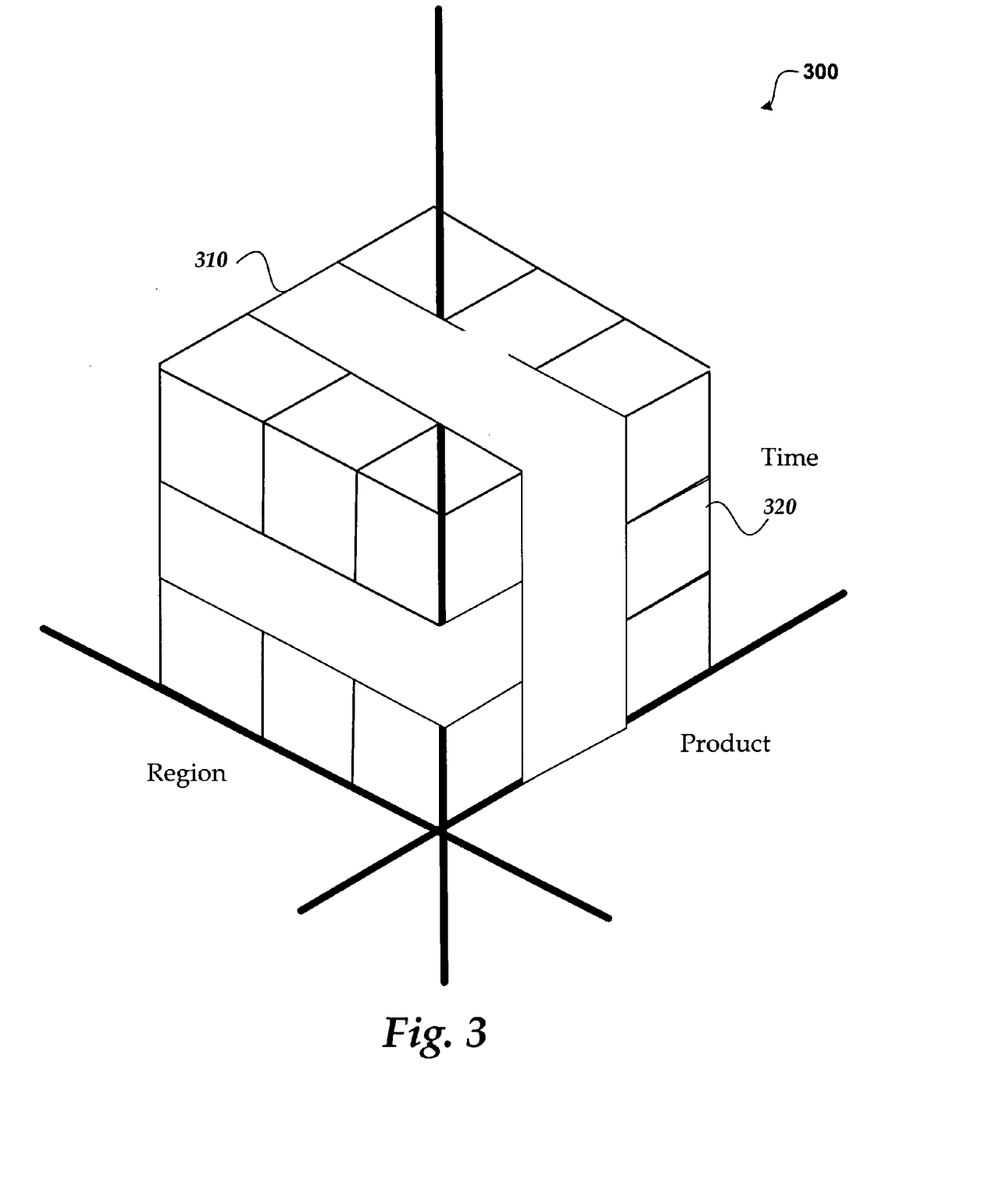
FIG. 3 illustrates an exemplary OLAP cube.

FIG. 3 illustrates an exemplary OLAP cube, in accordance with aspects of the present invention.

In an OLAP data model, information is viewed conceptually as cubes that consist of descriptive categories (dimensions) and quantitative values (measures). The multidimensional data model makes it easier for users to formulate complex queries, arrange data on a report, switch from summary to detail data, and filter or slice data into meaningful subsets. For example, typical dimensions in a cube containing sales information may include time, geography, product, channel, organization, and scenario (budget or actual). Typical measures may include dollar sales, unit sales, inventory, headcount, income, and expense.

Within each dimension of an OLAP data model, data can be organized into a hierarchy that represents levels of detail on the data. For example, within the time dimension, there may be levels for years, months, and days. Similarly, a geography dimension may include: country, region, state/province, and city levels. A particular instance of the OLAP data model would have the specific values for each level in the hierarchy. A user viewing OLAP data can move up or down between levels to view information that is either more or less detailed.

The cube is a specialized database that is optimized to combine, process, and summarize large amounts of data in order to provide answers to questions about that data in the shortest amount of time. This allows users to analyze, compare, and report on data in order to spot business trends, opportunities, and problems. A cube uses pre-aggregated data instead of aggregating the data at the time the user submits a query.

Hierarchies and levels can be defined for dimensions within the cube. Hierarchies typically display the same data in different formats such as time data can appear as months or quarters. Levels typically allow the data to be "rolled up" into increasing less detailed information such as in a Region dimension where cities roll-up into states which roll-up into regions which roll-up into counties and so forth. This allows the user to "drill-up" or "drill-down" to see the data in the desired detail. Levels and hierarchies for a star schema are derived from the columns in a dimension table. In a snowflake schema, they are typically derived from the data in related tables.

The exemplary OLAP cube illustrated includes three dimensions. The Region dimension may many different levels. For example, the region dimension may include a country level, a geographic area level (NE, NW, SE, SW, and the like), and a city level. The Products dimension may also include multiple levels. For example, has all, category and product. Finally, the third dimension, the Time dimension may include multiple levels, such as year, quarter, and month). The cube may also include multiple measures. For example, unit sales and purchases. This cube is presented to provide a reference example of how a cube is used. It will be appreciated that the OLAP cubes maintained by various embodiments of the invention may have more or fewer dimensions than in this example, and that the OLAP cube may have more or fewer hierarchy levels than in this exemplary example.

Each data cell in a multidimensional database is uniquely identified by specifying a coordinate on each dimension. In order to uniquely identify a particular member within the OLAP cube, each of the members from the root node to the leaf node for the member is specified forming a tuple. A tuple may contain one or more members. According to one embodiment, each tuple contains the same number of members to access the desired data within the cube.

Queries within cube 300 may be consolidated into a single query such that a single consolidated query may be used to retrieve data for a structured report. For example, the queries to cells 310 and queries to cells 320 may be consolidated into a single query. Instead of accessing cube with two different database hits for the structured report, a single database hit is incurred.

Structured Reports

Figure 4:
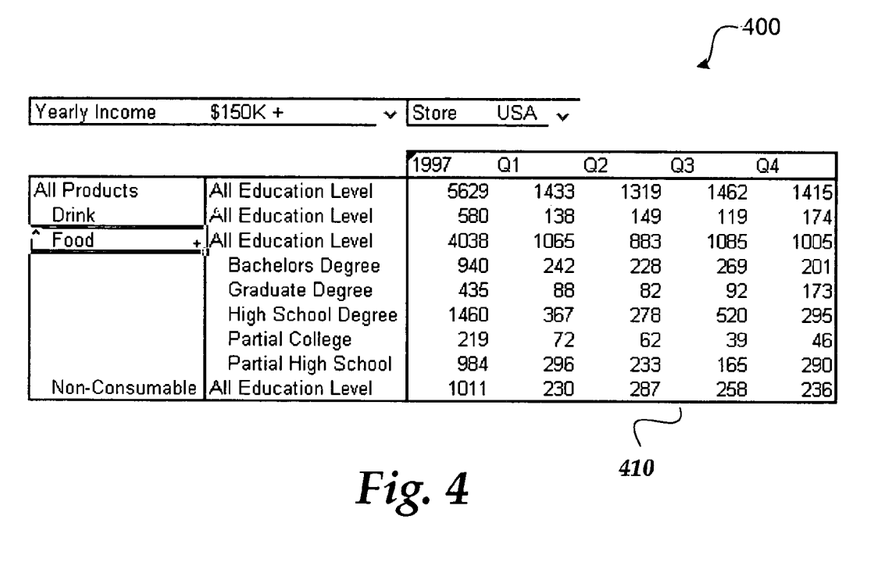
FIG. 4 illustrates a structured report.

FIG. 4 illustrates a structured report, in accordance with aspects of the invention.

A report consists of a connection to a data source, coupled with a layout that organizes the data values. Segments and a data grid are utilized in a structured report. Report cells form a contiguous block. According to one embodiment, a structured report layout consists of four possible regions, including a row axis; a column axis; a page filter axis; and a data grid. The row and column axes define the structure of a report. The cells where the axes intersect form the data grid, which is where the summarized numbers appear. Page filters restrict the data that appears in the data grid but they don't affect the row and column headers unless custom expressions are used.

When creating a structured report, the layout is defined before data is added. In a structured report layout, each axis can have one or more segments. Each segment contains one or more members from a single dimension. A dimension appears in only one segment. Nesting segments on an axis allows a user to dice by members of an additional dimension. For example, for each product on the rows axis, a user could show the sales for each income level, with columns still showing the months.

Explicit members of any dimension may be added to the row and column axes, and explicit members of a non-measures dimension to the page filter axis.

Multiple dimensions may be nested to a single axis. To nest dimensions on a structured report, simply add additional segments to an axis and then add members to each segment.

Measures can be added to the data grid area (410) of the report. If a user wants to display only one measure, then the measure may be added directly to the data grid. To display multiple measures to the report, or to display the name of the measure, the measures are added to a row or column axis.

In addition to adding individual members to the structured report, members can be found by using extended techniques. According to one embodiment, there are four extended ways to derive members that can be used with structured reports: Family relationships, level members, member searches, and custom expressions. Family relationships take advantage of the hierarchical relationships definitions defined in a dimension. A user can start with one member and then add members related to it. Leaves are members at the bottom of the hierarchy. They don't have any children below them. Finding the leaves of a member is particularly useful when you have a dimension that varies in depth, such as an organization chart, or a financial chart of accounts.

Level members may be used to select all the members of a level. A custom expression is a selection mechanism that is available in a structured report. A simple use is to select only the members of a level that are descendants of a specific member. A more complex use is to act as a data driven filter for members. If the set is based on the selected member then the results are restricted to descendants of that member. If the set is based on the entire hierarchy then the currently selected member is ignored. The level, a measure, a relationship, and one or more values may then be selected. Multiple conditions may be added. For example, a custom expression can show only high-volume stores that have a low profit margin.

In a structured report, a user can navigate to new members related to the ones on the row or column header. Drill Up replaces all the members in the segment with the parent of the selected member, along with all its siblings. Drill Down replaces all the members in the segment with the children of the selected member. Expand inserts the children of the selected member. If the segment is nested so that the selected member repeats for each member of the outer segment then all instances of the selected member are expanded. Collapse removes the children of the selected member. If the segments is nested (so that the selected member repeats for each member of the outer segment), collapses all instances of the selected member. Expand Only behaves like Expand except that if the segment is nested, expands only the selected member and not the repeated copies. Collapse Only behaves like Collapse except that if the segment is nested, collapses only the selected member and not the repeated copies. Isolate removes all members other than the selected member from the segment, including all repeated members in a nested segment. Eliminate removes the selected member from the segment, including all repeated members in a nested segment.

As illustrated in structured report 400, each axis within the structured report is examined to determine the queries needed to access the data within the OLAP cube. Once all of the individual queries are created, a consolidated query is generated that retrieves all of the data for the structure report in a single hit to the OLAP cube.

According to one embodiment of the invention, the consolidated query is a consolidation of MDX queries. A basic Multidimensional Expressions (MDX) query is structured in a fashion similar to the following example:

SELECT[<axis_specification>
[, <axis_specification> . . . ]]
FROM [<cube_specification>]
[WHERE [<slicer_specification>]]

In MDX, the SELECT statement is used to specify a dataset containing a subset of multidimensional data. To discuss the various syntax elements of the MDX SELECT statement, this topic presents a basic MDX query example and breaks it down into its syntax elements, discussing the purpose and structure of each element.

To specify a dataset, an MDX query contains information about: the number of axes; the members from each dimension to include on each axis of the MDX query; the name of the cube that sets the context of the MDX query; and the members from a slicer dimension on which data is sliced for members from the axis dimensions.

The following MDX query example is used to illustrate the various parts of basic MDX SELECT statement syntax:

SELECT
{[Measures].[Unit Sales], [Measures].[Store Sales]} ON COLUMNS,
{[Time].[1997], [Time].[1998]} ON ROWS
FROM Sales
WHERE ([Store].[USA].[CA])

The basic MDX SELECT statement contains a SELECT clause and a FROM clause, with an optional WHERE clause.

The SELECT clause determines the axis dimensions of an MDX SELECT statement. Two axis dimensions are defined in the MDX query example. The FROM clause determines which multidimensional data source is to be used when extracting data to populate the result set of the MDX SELECT statement.

The WHERE clause optionally determines which dimension or member to use as a slicer dimension; this restricts the extracting of data to a specific dimension or member. The MDX query example uses a WHERE clause to restrict the data extract for the axis dimensions to a specific member of the Store dimension. The MDX SELECT statement supports other optional syntax, such as the WITH keyword, and the use of MDX functions to construct members by calculation for inclusion in an axis or slicer dimension. The syntax format of the MDX SELECT statement is similar to that of SQL syntax; however, there are differences. MDX syntax distinguishes sets by surrounding tuples or members with braces (the {and} characters.)

According to one embodiment, MDX queries can have up to 128 axis dimensions in the SELECT statement, but only the first 5 axes have aliases. An axis can be referred to by its ordinal position within an MDX query or by its alias, if it has an alias assigned to it. In the MDX query example, the COLUMNS and ROWS axis aliases are used. The MDX query could also have been written in the following fashion, using the ordinal position of each axis:

SELECT
   {[Measures].[Unit Sales], [Measures].[Store Sales]} ON AXIS(0),
   {[Time].[1997], [Time].[1998]} ON AXIS(1)
FROM Sales
WHERE ([Store].[USA].[CA])

As with an SQL query, the FROM clause names the source of the data for the MDX query. The WHERE clause is used to describe the slicer dimensions. The WHERE clause can change the filtering process for specified dimensions, allowing fine control of included data.

Figure 5:
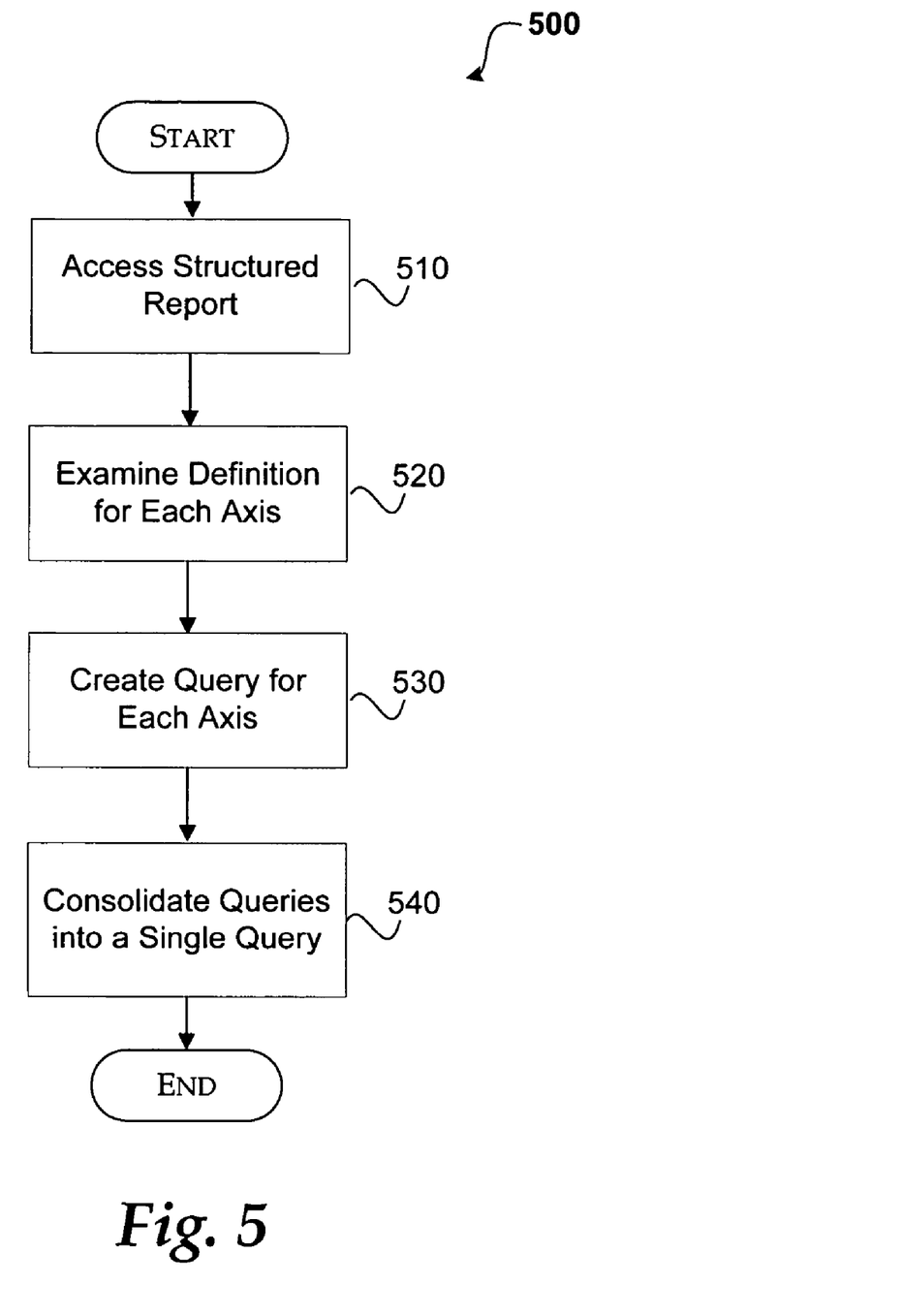
FIG. 5 illustrates a process for creating a consolidated query to obtain data from an OLAP cube for a structured report, in accordance with aspects of the invention.

FIG. 5 illustrates a process for creating a consolidated query to obtain data from an OLAP cube for a structured report, in accordance with aspects of the present invention. After a start block, the process flows to block 510, where the structured report in the spreadsheet is accessed. Moving to block 520, each axis within the structured report is examined. At block 530, a query is created that may be used to obtain data from an OLAP cube relating to the examined axis. Moving to block 540, each of the queries is consolidated into a single query.

Illustrative Operating Environment

Figure 1:
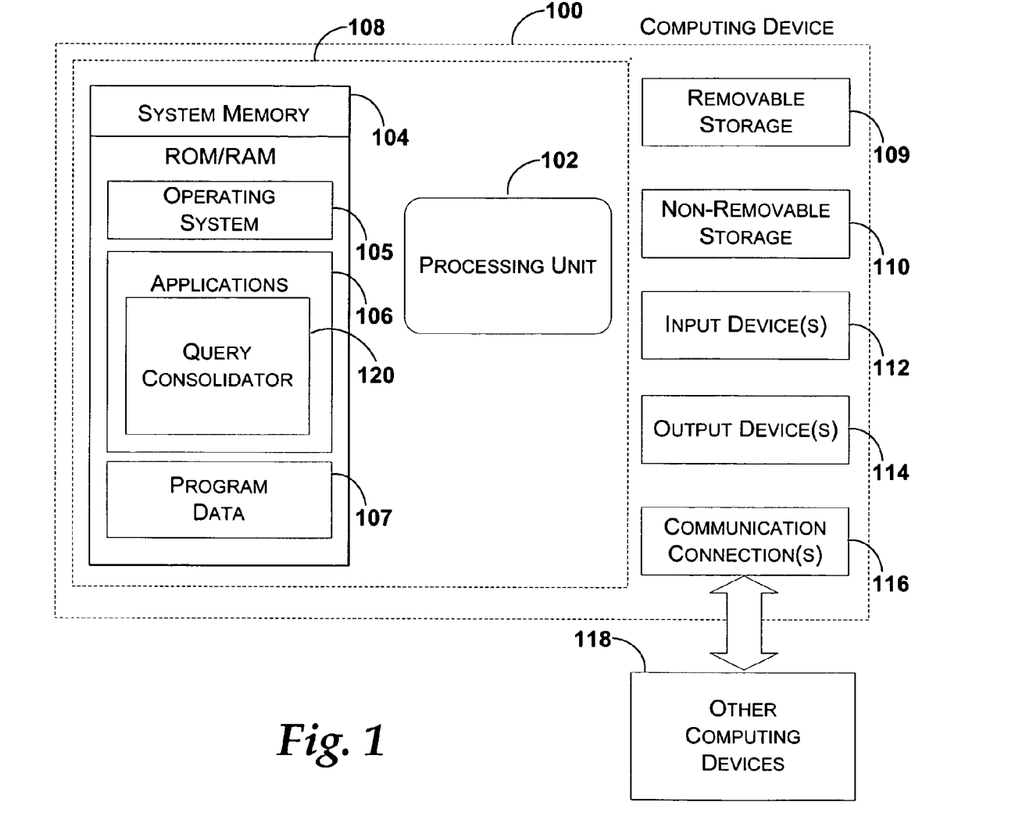
FIG. 1 is an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include query consolidator 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for consolidating OLAP (Online Analytical Processing) queries, comprising:
displaying a structured report within spreadsheet on client application on a client computing device, wherein the structured report is connected to at least one data source and comprises a layout and regions that comprises a row axis, a column axis, a page filter axis and a data grid including cells, wherein the row and column axes define a structure of the report and the data grid is formed by the cells where the axes intersect, wherein each axis more comprise one or more segment that contain one or more members from a dimension;
displaying selectable page filters with the display of the structured report that restricts the data that is displayed within one or more cell of the data grid of the structured report without affecting row and column headers of the structured report;
wherein the client application is a spreadsheet application that interacts with a query consolidator plug-in of the client application that is located on the client computing device, and functionality of the query consolidator plug-in is included within the client application, and the query consolidator plug-in is configured to perform the following:
directly interact with an OLAP server to retrieve data from an OLAP cube;
access the displayed structured report from within the client application;
examine the structured report to determine each axis within the structured report that references data within the OLAP cube; wherein examining the structured report includes examining each axis to determine the queries;

generate a first Multidimensional Expressions (MDX) query for the first axis of the structured report; wherein the first query is configured to query the OLAP cube for data;

generate a second MDX query for the second axis of the structured report;

wherein the second query is configured to query the OLAP cube for data;

wherein the first MDX query and second MDX query are generated directly from the examination of the structured report;

on the client computing device, consolidate the first MDX query and the second MDX query into a single MDX consolidated query configured to query the OLAP cube for data; wherein creating the consolidated query occurs before the client application interacts with the OLAP server to retrieve data from the OLAP cube; and send the consolidated query to retrieve the data from the OLAP cube.

2. The method of claim 1, wherein the consolidated query combines all of The queries into a single query.

3. The method of claim 2, further comprising sending the single query to an OLAP service.

4. The method of claim 3, further comprising receiving a response from the OLAP service and updating the structured report with the information retrieved.

5. The method of claim 1, wherein examining the structured report to determine the queries to retrieve data from an OLAP cube comprises examining each axis definition within the structured report and creating a query to retrieve the data from the OLAP cube relating to each axis.

6. The method of claim 5, wherein the consolidated MDX query comprises a number of axes, members from each dimension of the OLAP cube, a name of the OLAP cube, and members from a slicer dimension.

7. A computer-readable storage medium storing computer executable instructions for consolidating OLAP queries, comprising:

accessing a client spreadsheet on a client computing device containing a displayed structured report that includes a display of selectable page filters with the displayed structured report that restricts the data that is displayed within one or more cell of the data grid of the structured report without affecting row and column headers of the structured report;

wherein the client spreadsheet is displayed on the display of a client computing device;

wherein the structured report is connected to at least one data source and comprises a layout and regions that comprises a row axis, a column axis, a page filter axis and the data grid including said cells, wherein the row and column axes define a structure of the report and the data grid is formed by the cells where the axes intersect, wherein each axis more comprise one or more segment that contain one or more members from a dimension;

examining each axis within the displayed structured report to determine the data to be retrieved from an OLAP cube;

generating a plurality of Multidimensional Expressions (MDX) queries, wherein each generated MDX query is associated with an axis that references data within the OLAP cube without sending the query to request data from the OLAP cube;

on the client computing device consolidating each of the plurality of generated MDX queries into a single MDX query to create a consolidated MDX query; and sending only the consolidated MDX query from the client computing device to retrieve the data.

8. The computer-readable medium of claim 7, further comprising: using the consolidated MDX query to request data from the OLAP cube.

9. The computer-readable medium of claim 8, wherein the consolidated MDX query combines all of the queries into a single query.

10. The computer-readable medium of claim 9, further comprising receiving the data from the OLAP cube and updating the structured report within the spreadsheet with the data retrieved from the OLAP cube.

11. The computer-readable medium of claim 8, wherein the consolidated MDX query includes a number of axes, members from each dimension of the OLAP cube, a name of the OLAP cube, and members from a slicer dimension.

12. A system for consolidating OLAP queries, comprising:

a processor and a computer-readable storage medium;

an operating environment stored on the computer-readable storage medium and executing on the processor;

a display;

an OLAP cube;

a spreadsheet containing a structured report that is displayed on the display of a client computing device that includes a display of selectable page filters with the displayed structured report that restricts the data that is displayed within one or more cell of the data grid of the structured report without affecting row and column headers of the structured report; wherein the structured report is connected to at least one data source and comprises a layout and regions that comprises a row axis, a column axis, a page filter axis and the data grid including said cells, wherein the row and column axes define a structure of the report and the data grid is formed by the cells where the axes intersect, wherein each axis more comprise one or more segment that contain one or more members from a dimension; and a a query consolidator that is located on the client computing device that is operating under the control of the operating environment that is configured to:

access the displayed structured report within the spreadsheet;

examine each of the axes in the structured report ;

wherein the structured report includes more than one axis;

generate a plurality of MDX queries, wherein each of the plurality of generated queries is generated in response to one of the axis of the report such that each axis of the report is associated with a generated query;

consolidate each of the plurality of generated queries into a single query on the client computing device to create a consolidated query to access data from the OLAP cube before a query is made to retrieve data from the cube using the generated queries; and send the consolidated query to retrieve the data.

13. The system of claim 12, wherein the consolidated query is an MDX query.

14. The system of claim 13, further comprising an OLAP service configured to receive the single query.

15. The system of claim 14, further comprising the query consolidator sending the single query to the OLAP service and receiving a response from the OLAP service and updating the structured report within the spreadsheet with the information retrieved.

16. The system of claim 13, wherein examining the structured report to determine queries to retrieve data from the OLAP cube comprises examining each axis definition within the structured report to determine the data to retrieve from the OLAP cube.

17. The system of claim 16, wherein the consolidated query is an MDX query, the MDX query comprising a number of axes, members from each dimension of the OLAP cube, a name of the OLAP cube, and members from a slicer dimension.

18. The system of claim 16, wherein the consolidated query is an SQL query.

* * * * *